United States Patent
Yabe et al.

(10) Patent No.: US 6,639,019 B2
(45) Date of Patent: Oct. 28, 2003

(54) RUBBER COMPOSITION AND RUBBER SEALING DEVICE

(75) Inventors: Toshikazu Yabe, Kanagawa (JP); Takahiko Uchiyama, Kanagawa (JP); Nariaki Aihara, Kanagawa (JP); Keisuke Yokoyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 35 days.

(21) Appl. No.: 10/073,875

(22) Filed: Feb. 14, 2002

(65) Prior Publication Data

US 2002/0161127 A1 Oct. 31, 2002

(30) Foreign Application Priority Data

Feb. 23, 2001 (JP) .................. P2001-048612

(51) Int. Cl.$^7$ .............. C08L 27/18; C08L 23/14; C09K 3/10; F16J 15/20
(52) U.S. Cl. ............. 525/199; 525/232; 525/240; 384/7; 384/18; 384/19; 384/91
(58) Field of Search ................. 525/199, 232, 525/240; 384/7, 18, 19, 91

(56) References Cited

U.S. PATENT DOCUMENTS

| | | | | | |
|---|---|---|---|---|---|
| 5,422,404 | A | * | 6/1995 | Zielinsky et al. | 525/356 |
| 5,590,965 | A | * | 1/1997 | Yabe et al. | 384/15 |
| 5,678,927 | A | * | 10/1997 | Yabe et al. | 384/13 |
| 6,274,676 | B1 | * | 8/2001 | Lin et al. | 525/240 |

\* cited by examiner

*Primary Examiner*—Nathan M. Nutter
(74) *Attorney, Agent, or Firm*—Sughrue Mion, PLLC

(57) ABSTRACT

A rubber composition containing a tetrafluoroethylene-propylene bipolymer and from 0.02 to 10 parts by weight of a liquid polybutadiene per 100 parts by weight of the tetrafluoroethylene-propylene bipolymer and a rubber sealing device in which the rubber composition is joined to a reinforcing member are described, by which long-life rubber sealing devices which are highly tolerant to liquids containing amine-based additives, for example, soluble-type synthetic cutting coolants and engine oils suitable for high-speed processing and can sustain favorable sealing performance over a long period of time and rubber compositions appropriate therefor are provided.

18 Claims, 7 Drawing Sheets

RUBBER COMPOSITION AND RUBBER SEALING DEVICE

FIELD OF THE INVENTION

This invention relates to an improvement in rubber sealing devices, for example, oil seals, rolling bearing seals, and rubber seals in linear acting apparatuses such as linear guides and ball screws which are employed to prevent the leakage of greases or lubricants and the invasion of foreign materials from the outside.

BACKGROUND OF THE INVENTION

Linear acting apparatuses such as linear guides and ball screws, oil seals and rolling bearings are provided with rubber sealing devices in order to prevent the leakage of greases or lubricants and the invasion of foreign materials from the outside.

These rubber sealing devices usually have a unified structure wherein a reinforcing member made of a metal is joined to a rubber composition with the use of an adhesive. As the rubber composition, acrylonitrile butadiene rubber (NBR) is most commonly employed by taking oil resistance into consideration. In case where particularly high heat resistance and chemical resistance are required, use is made of acrylic rubbers, silicone rubbers and fluororubbers (for example, vinylidene fluoride-hexafluoropropylene and vinylidene fluoride-hexafluoropropylene-tetrafluoroethylene commonly called FKM).

In recent years, spindle speeds of machine tools, in which many linear acting apparatuses, oil seals and rolling bearings are employed, have been elevated to satisfy the requirement for improving the processing performance. For example, in a linear guide frequently employed in cutting tools, the temperature at the cutting point is elevated with an increase in the spindle speed. As a result, it is required that a cutting oil solution has such a high permeability as to instantaneously attain the cutting point as well as an improved cooling performance. It is also required that a cutting oil solution sustains its lubricating properties at the cutting point at a high temperature under high pressure.

To satisfy these requirements, there have been developed and spread soluble-type synthetic cutting coolants, which are completely soluble in water, as substitutes for the conventional emulsion-type water-soluble cutting oils. These soluble-type synthetic cutting coolants are advantageous from the environmental viewpoint too, since the waste water can be easily processed. However, these soluble-type synthetic cutting coolants contain a large amount of various additives such as amines to elevate the permeability and, therefore, show a high permeability into rubbers constituting rubber sealing devices too, thereby frequently causing deteriorations (swelling, softening, etc.) of rubbers. As a result, the rubber strength at the lips of rubber sealing devices is weakened. In case of a lip of the contact type, in particular, the exposed thread of the seal is enlarged and thus the abrasion is accelerated. Thus, the sealing properties are worsened. Moreover, the life of the member provided with the seal per se is shortened thereby. In a fluororubber (FKM), in particular, the vinylidene fluoride moiety in the structure easily undergoes de-HF due to the amine-based additives and thus the deterioration of the rubber is accelerated. Consequently, the rubber strength is further lowered in many cases.

These amine-based additives sometimes cause deterioration of adhesives by which reinforcing members are joined to rubbers. In a nitrile rubber sealing device, for example, a reinforcing member is joined to the nitrile rubber usually with a phenol-based adhesive. When this sealing device is immersed over a long time in a soluble-type synthetic cutting coolant diluted with water, it is sometimes observed that the nitrile rubber is swollen and softened and the phenol-based adhesive is deteriorated so that the nitrile rubber completely peels off from the reinforcing member.

Since automotive engine oils and antifreezes also contain amine-based additives in many cases, it is feared that the same troubles might arise in automotive rolling bearings.

SUMMARY OF THE INVENTION

The invention, which has been completed under these circumstances, aims at providing long-life rubber sealing devices which are highly tolerant to liquids containing amine-based additives (in particular, soluble-type synthetic cutting coolants suitable for high-speed processing, automotive coolants and engine oils) and can sustain favorable sealing performance over a long period of time and rubber compositions appropriate therefor.

To attain this aim, the invention provides a rubber composition to be joined to a reinforcing member of a rubber sealing device which contains a tetrafluoroethylene-propylene bipolymer and from 0.02 to 10 parts by weight of a liquid polybutadiene per 100 parts by weight of the tetrafluoroethylene-propylene bipolymer.

The invention further provides a rubber sealing device having a reinforcing member and a rubber composition joined thereto, wherein the rubber composition contains a tetrafluoroethylene-propylene bipolymer and from 0.02 to 10 parts by weight of a liquid polybutadiene per 100 parts by weight of the tetrafluoroethylene-propylene bipolymer.

DESCRIPTION OF THE REFERENCE NUMERALS

Figure 1:
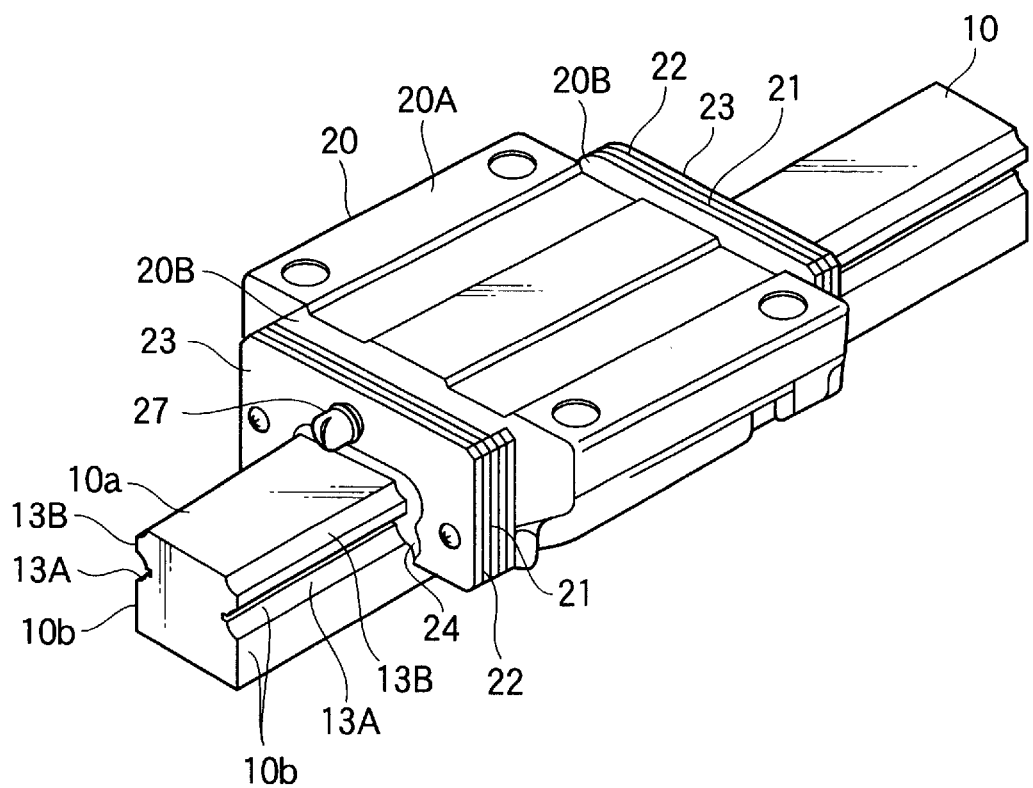
FIG. 1 is an oblique perspective view showing an example of a linear guide to which the invention is applied.

10: guide rail
20: slider
22: lubricant feeding member
23: side seal (rubber sealing device)

24: sealing member
31: screw shaft
32: ball screw nut
41: lubricant feeder
42: rubber sealing device
42b: core metal (reinforcing member)
42c: seal body
50: water pump
51: impeller
52: rotating shaft
55: rolling bearing
60: rubber sealing device
61: sealing plate
61a: core metal (reinforcing member)
62: seal body
65: flinger
71: oil seal for shaft
72: seal cover
73: spring cover
74: seal body
75: metal ring (reinforcing member)
76: garter spring
80: rotating shaft

DETAILED DESCRIPTION OF THE INVENTION

Now, the rubber composition and the rubber sealing device according to the invention will be described in detail.

First, the rubber composition according to the invention will be illustrated. The rubber serving as the base of the rubber composition is a biopolymer of tetrafluoroethylene (hereinafter referred to simply as "PTFE") and propylene -(hereinafter referred to simply as "PP") which will be referred to simply as "PTFE-PP" hereinafter. Considering the molding properties and the mechanical strength of molded articles, it is preferable that the PTFE-PP has a composition ratio of 40 to 70% by mol of PTFE and 30 to 60% by mol of PP, with the total of the composition ratio of PTFE and the composition ratio of PP being 100% by mol.

The method of producing the PTFE-PP can be selected from among various polymerization methods such as bulk polymerization, suspension polymerization, emulsion polymerization and solution polymerization without particular restriction. Use can be made of the catalytic polymerization method with the use of a free radical initiator, the ionization radial polymerization method or the reodx polymerization method.

Since the PTFE-PP is free from vinylidene fluoride in its skeleton, it never undergoes a de-HF reaction due to amine-based additives contained in soluble-type synthetic cutting coolants or engine oils. Thus, there arises no problem of lowering the rubber strength. However, the PTFE-PP is poor in the vulcanization properties. Therefore, it is necessary to improve the vulcanization properties by, for example, copolymerizing with a monomer containing iodine or bromine or heating to enable vulcanization with an organic peroxide.

As the crosslinking agent to be used therefor, it is favorable to select a crosslinking agent usable in crosslinking the liquid polybutadiene, as will be described hereinafter, at the same time. For example, it is appropriate to use dicumyl peroxide, benzoyl peroxide, 2,5-dimethyl-2,5-di(t-butylperoxy)hexane or 1,3-bis(t-butylperoxy) diisopropylbenzene. As an auxiliary vulcanization accelerator, it is appropriate for the same reason to use, for example, polyallyl compounds such as triallyl isocyanate and triallyl cyanurate, trimethylolpropane trimethacrylate or sodium stearate.

The PTFE-PP is blended with a liquid polybutadiene. This liquid polybutadiene forms a surface layer and thus improves the mold release characteristics of the rubber composition. Since the liquid polybutadiene is little compatible with the PTFE-PP having a large amount of fluorine atoms in the molecule, the liquid polybutadiene added to the PTFE-PP is present on the PTFE-PP surface. Thus, a surface layer mainly containing the polybutadiene having good mold release characteristics is uniformly formed on a molded article made of the rubber composition. Owing to this constitution, a molded article can be obtained at a high accuracy even in case where vulcanization molding is conducted by using a mold of a complicated shape.

Since polybutadiene is usually an elastic material, the surface layer mainly containing the polybtuadiene has a high elasticity, thereby enabling vulcanization adhesion to a reinforcing member which can be hardly achieved by using the PTFE-PP alone. This is seemingly because the surface layer mainly containing the polybutadiene contains a great number of double bonds which undergo chemically binding to the metal surface employed as the reinforcing member.

The liquid polybutadiene is added at a ratio of from 0.02 to 10 parts by weight, preferably from 0.3 to 3 parts by weight, per 100 parts by weight of the PTFE-PP. When the content of the liquid polybutadiene is less than 0.02 parts by weight, the effect of improving the mold release characteristics as discussed above cannot be sufficiently established. In this case, the adhesion properties to the reinforcing member are worsened. On the other hand, it is undesirable that the content of the liquid polybutadiene exceeds 10 parts by weight, since the heat resistance of the whole rubber composition is worsened and the tolerance to amine-based additives is also worsened in this case.

As the liquid polybutadiene, it is preferable to use compounds having hydroxyl groups in the structure as represented by the following formulae (1) and (2) or a compound having carboxyl groups in the structure as represented by the following formula (3). Also, use may be made of a compound free from any functional group in the structure as represented by the following formula (4). In the formulae, n represents an integer. In modified liquid polybutadienes having "OH" groups as represented by the formulae (1) to (3), in particular, the "C=C" double bonds are crosslinked by the crosslinking agent, which is added for the crosslinkage of the PTFE-PP, and the "OH" groups further react with isocyanurate serving as the auxiliary crosslinking accelerator to form bonds. As a result, such a compound becomes an elastic material having a higher molecular weight and, in its turn, the adhesive properties to the reinforcing member are improved.

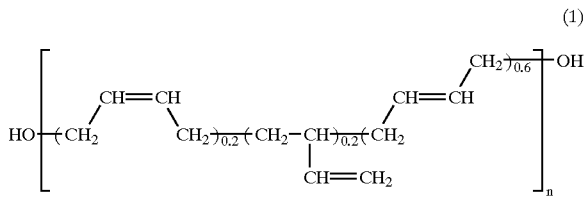

-continued

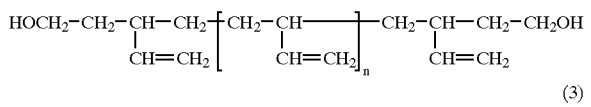

(2)

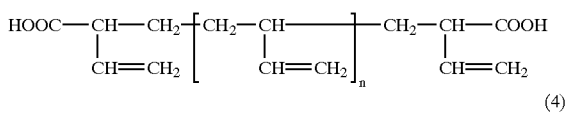

(3)

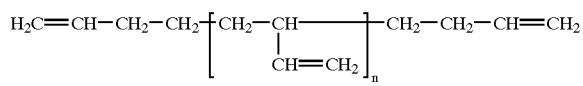

(4)

It is further preferable that the number-average molecular weight of the liquid polybutadiene ranges from 1,000 to 5,000. When the number-average molecular weight is less than 1,000, it is difficult to handle the liquid polybutadiene because of the low viscosity. In this case, moreover, the crosslinking agent and the auxiliary crosslinking accelerator added for the crosslinking of the PTFE-PP are consumed for the crosslinkage of the polybutadiene and thus these additives should be used in larger amounts, thereby resulting in an increase in the cost. When the number-average molecular weight of the liquid polybutadiene exceeds 5,000, on the other hand, it is difficult to handle the liquid polybutadiene because of the excessively high viscosity. In this case, moreover, the surface layer mainly containing the polybutadiene becomes too thick and thus the oil resistance is worsened.

To further enhance the adhesion properties between the rubber composition and the reinforcing member by the liquid polybutadiene, it is preferable to use a silane-based adhesive containing a silane coupling agent having vinyl or amino groups in adhering the rubber composition to the reinforcing member. Thus, a rubber sealing device in which the rubber composition is joined to the reinforcing member at a stronger adhesive force than in conventional cases can be obtained. As examples of appropriate silane coupling agents, silane coupling agents having vinyl groups such as vinyl triethoxy silane and γ-methacryloxypropyl trimethoxy sialne and silane coupling agents having amino groups such as γ-aminopropyl triethoxy silane can be cited.

In these silane coupling agents, hydrolyzing alkoxy groups hydrolyze silanol groups. Then the silanol groups undergo a coupling reaction (dehydrocondensation) with OH groups on the surface of the metal serving as the reinforcing member thereby being chemically bonded thereto. At the same time, vinyl or amino groups are incorporated into double bonds present in the structure or incorporated into the structure during the crosslinking reaction. Thus, the rubber composition is chemically joined to the metal, thereby achieving strong adhesion.

It is preferable that the rubber composition according to the invention further contains a filler for reinforcement. Appropriate examples of the filler include carbon black, talc, wollastonite and mistron paper. Such a filler is added at a ratio of from 20 to 70 parts by weight per 100 parts by weight of the PTFE-PP. However, it is unfavorable to use acidic substances such as silica and clay which would retard vulcanization.

The rubber composition according to the invention may further contain publicly known additives for rubbers, if needed.

In the invention, the preparation of the rubber composition and the production of the rubber sealing device can be arbitrarily carried out without particular restriction. For example, the following methods may be employed therefor.

First, a PTFE-PP, a liquid polybutadiene and a filler optionally together with additives for rubbers are fed at a definite ratio into a Banbury mixer and then masticated at a mixer temperature of about 80° C. Next, the masticated matter is transferred from the Banbury mixer into a twin-roll mill for kneading rubbers. While controlling the roll temperature to about 50° C., a crosslinking agent and an auxiliary crosslinking accelerator are added thereto and the mixture is kneaded until it becomes homogeneous. Thus the rubber composition according to the invention can be obtained.

To construct a rubber sealing device, a reinforcing member, onto which an adhesive has been preliminarily stoved, is put into a mold. Then the rubber composition is introduced thereinto and heated. Thus the rubber composition is vulcanized/molded and, at the same time, joined to the reinforcing member. The molding conditions such as the heating temperature and pressure may be appropriately determined by considering the composition of the rubber composition.

The rubber composition and the rubber sealing device according to the invention exert remarkable effects particularly in case of being brought into contact directly with water or chemical solutions or frequently suffering from the contamination with foreign materials, for example, the side seal of a linear guide, a ball screw seal, a rolling bearing for water pumps and an oil seal for shafts. Now, preferred embodiments thereof will be illustrated.

Considering these uses, it is preferable that the rubber composition according to the invention has a spring hardness measured with the Durometer A scale (according to JIS K6301) of from 60 to 90. When the spring hardness is less than 60, the seal end (lip) is frequently deformed due to contact and the frictional resistance is enlarged so that the device cannot be smoothly driven, though these phenomena somewhat vary depending on the type of the rubber sealing device. When the spring hardness exceeds 90, the rubber elasticity is lowered and the follow-up characteristics (i.e., sealing properties) are worsened in the lip. As a result, there frequently arise the leakage of greases or lubricants and the invasion of foreign materials from the outside and thus the life of the device is shortened. To control the degree of deformation at the lip and the rubber elasticity each to a particularly favorable level, it is preferable that the spring hardness falls within the range of from 70 to 80.

In order to quickly follow up with motion while avoiding damage of the lip, it is desirable that the rubber composition has such a mechanical strength as giving a tensile elongation at break of 200% or more and a tensile strength at break of 13 MPa more, in addition to the hardness as defined above.

First Embodiment: Linear Guide

As the oblique perspective view of FIG. 1 shows, a linear guide is provided with a guide rail 10, which has rolling element rolling grooves 13A and 13B on the outer face and lengthens in the shaft direction, and a slider 20 located over this guide rail 10. This slider 20 contains a slider body 20A and end caps 20B provided at both ends. The slider body 20A has load rolling element rolling grooves (not shown) opposite to the rolling element rolling grooves 13A and 13B of the guide rail 10 in the inner side of both sleeves and a rolling element return path bored through the thick part of the sleeve in the shaft direction. Each end cap 20B has a curved path (not shown) connecting the rolling element rolling groove of the slider body 20A to the rolling element return path parallel thereto. The rolling element rolling groove, the rolling element return path and the curved paths in both sides form together a rolling element circulation circuit. A large number of rolling elements made of, for example, steel balls are provided in this rolling element circulation circuit. In this figure, the reference numeral 27 stands for a grease nipple.

Figure 2:
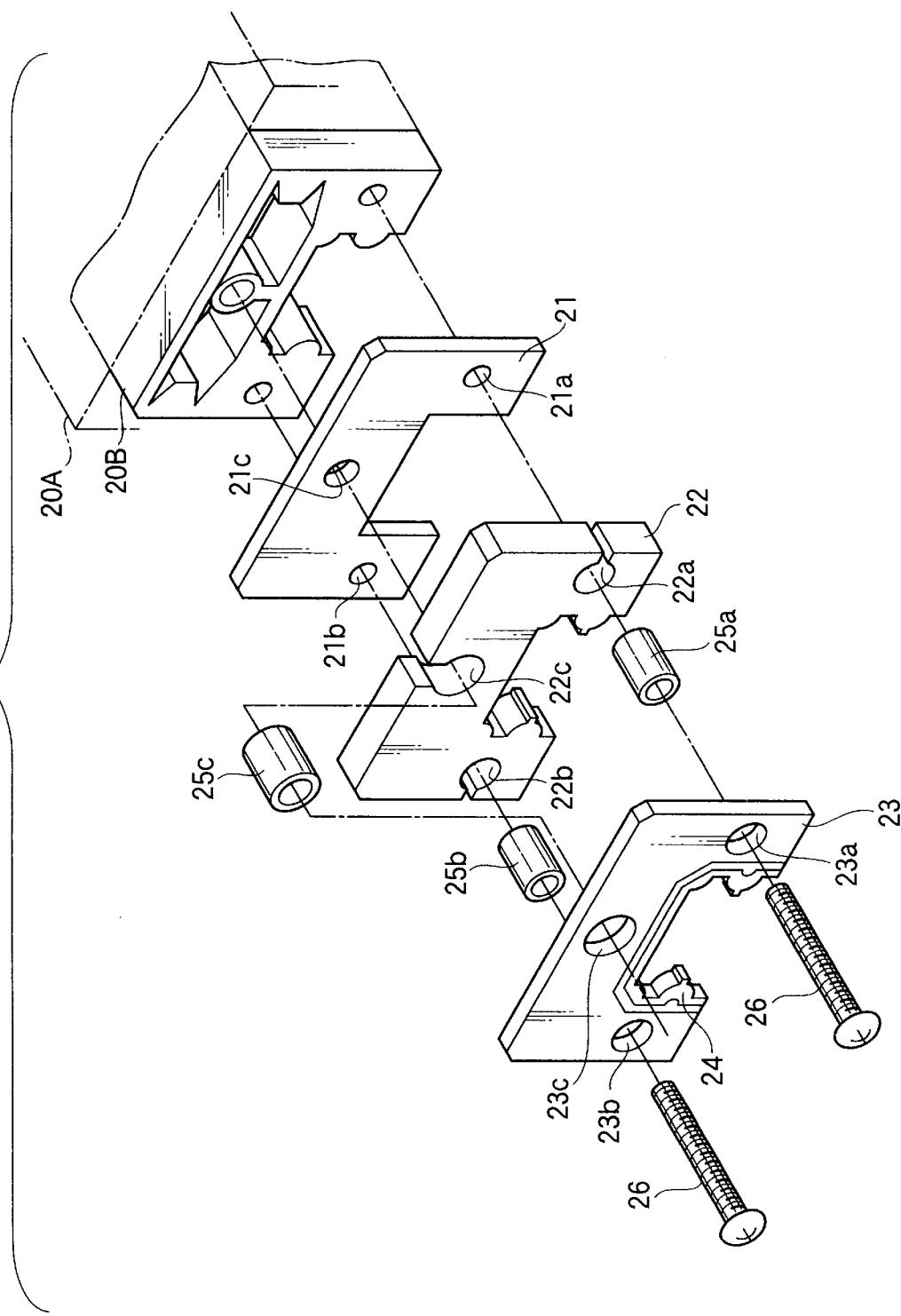
FIG. 2 is a exploded oblique perspective view showing the slider part of the linear guide of FIG. 1.

As the oblique perspective view of FIG. 2 showing the fabricated state of an end part of the slider 20 shows, a reinforcing plate 21, a lubricant feeding member 22 and a side seal 23 are piled up and fixed, from the side close to the end cap 20B, on the outer face of each end cap 20B. The lubricant feeding member 22 is a member made of a lubricant-containing polymer which is a resin having been fixed in the state of containing a lubricant therein. The lubricant held within the resin is gradually oozes out, thereby enabling lubrication over a long period of time. The reinforcing plate 21 is an open sided square steel plate matching with the outer shape of the end cap 20B. Two holes 21*a* and 21*b* for fixing screws 26 are formed on its both sleeves. At the joint part of these sleeves, another hole 21*c* for the grease nipple is formed. This reinforcing plate 21 is not brought into contact with the guide rail 10. In this figure, the reference numerals 25*a* to 25*c* stand for ring-type sleeve members. Moreover, holes 22*a* and 22*b* for the fixing screws and another hole 22*c* for the grease nipple are formed in this lubricant feeding member 22.

The side seal 23, which corresponds to the rubber sealing device according to the invention, contains an open sided square steel plate (a reinforcing member) matching with the outer shape of the end caps 20B and a sealing member 24 coming into contact with the guide rail 23. The sealing member 24, which is made of the rubber composition according to the invention, is joined to the steel plate by vulcanization adhesion. Further, the whole inner peripheral face of the sealing member 24 is molded into a shape allowing to slide over the upper face 10*a* and the outer side face 10*b* of the guide rail 10 and the rolling element rolling grooves 13A and 13B so as to enable sealing the gap between the slider 20 and the guide rail 10. Moreover, holes 23*a* and 23*b* for the fixing screws and another hole 23*c* for the grease nipple are formed in this side seal 23.

Second Embodiment: Ball Screw

Figure 3:
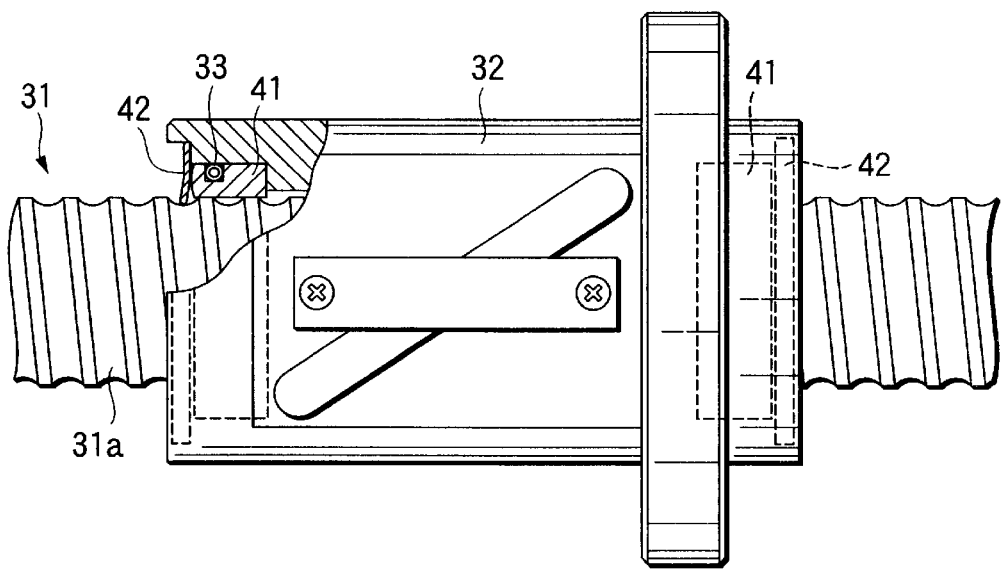
FIG. 3 is a partially broken plan view showing an example of a ball screw to which the invention is applied.

As the partially broken plan view of FIG. 3 shows, a ball screw is provided with a screw shaft 31 having a spiral screw groove 31*a* with a circular section on its outer periphery, a cylindrical ball screw nut 32 having a spiral screw groove opposite to the screw groove 31*a* of the screw shaft 31 on the inner face and being matched with the screw shaft 31, and a large number of balls (not shown) which are provided in the spiral space having a roughly circular section formed by the screw groove 31*a* of the screw shaft 31 and the screw groove of the ball screw nut 32 in a state of allowing free rolling. Within the both ends of the ball screw nut 32 in the shaft direction, cylindrical lubricant feeders 41 and 41 made of a lubricant-containing polymer are fitted under pressing by a garter spring 33. The lubricant held therein gradually oozes out for lubrication.

Figure 4:
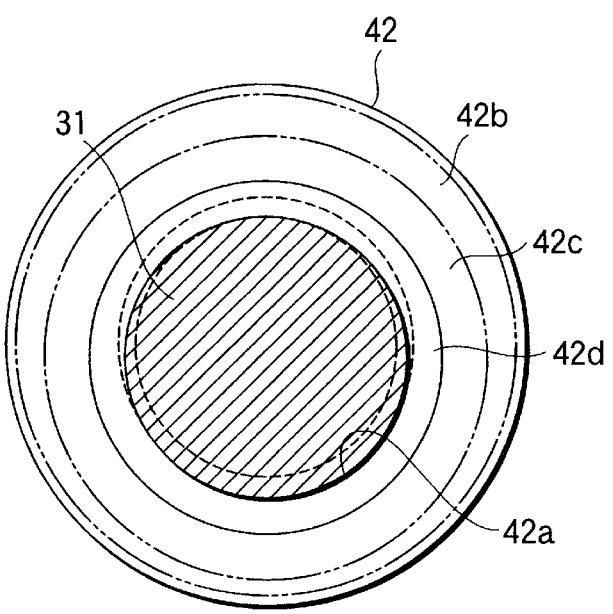
FIG. 4 is a plan view from the direction vertical to the screw shaft showing a rubber sealing device to be used in the ball screw of FIG. 3.

Further, rubber sealing devices 42 and 42 are provided in the outer side in the shaft direction of the lubricant feeders 41. As FIG. 4 (a plan view from the direction vertical to the screw shaft 31) and FIG. 5 (an enlarged sectional view) show, each rubber sealing device 42 contains a seal body 42*c* and a core metal (a reinforcing member) 42*b* enclosed therein. The outer periphery of the seal body 42*c* is fixed to a ball screw nut 32 which is not shown in the figures. The seal body 42*c* is further provided with a seal piece 42*d* which tilts outward in the shaft direction and lengthens inside. This seal piece 42*d* forms an opening 42*a* which matches with the sectional shape of the screw shaft 31 and has a somewhat smaller inner diameter than it. The seal body 42*c* and the seal piece 42*d* are integrally molded by using the rubber composition according to the invention and then joined to the core metal 42*b* by vulcanization adhesion.

Figure 5:
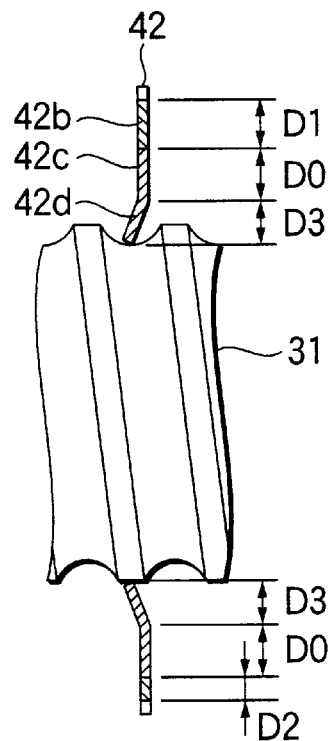
FIG. 5 is an enlarged view showing the rubber sealing device of the ball screw of FIG. 3.

Although the core metal 42*b* has a circular outer periphery, its inner periphery has a similar shape to the opening 42*a* of the rubber sealing device 42. Namely, the bottom width D2 is smaller than the top width D1, as shown in FIG. 5. Accordingly, the distance D0 from the inner periphery of the core metal 42*b* to the inner periphery of the seal body 42*c* and the distance D3 from the inner periphery of the seal body 42*c* to the seal piece 42*d* can be maintained constant all over the periphery. Thus, the deflection dose of the rubber sealing device 42 being in contact with the screw shaft 31 can be maintained almost constant.

Figure 6:
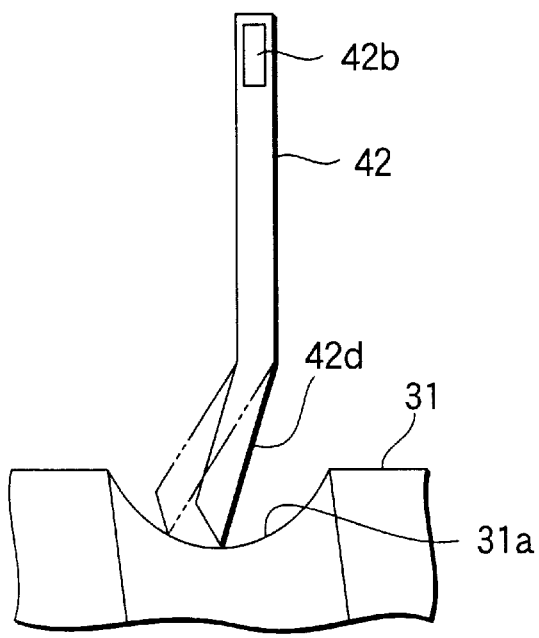
FIG. 6 is a model view showing the rubber sealing device of the ball screw of FIG. 3 in the deformed state.

FIG. 6 is a model view showing the deformation of the rubber sealing device 42 being in contact with the screw shaft 31. Since the rubber sealing device 42 has the shape and the constitution as described above, the seal piece 42*d* follows up with the shape of the screw groove 31*a* and thus deforms, thereby forming a sealed structure continuously.

Third Embodiment: Rolling Bearing for Water Pump

Figure 7:
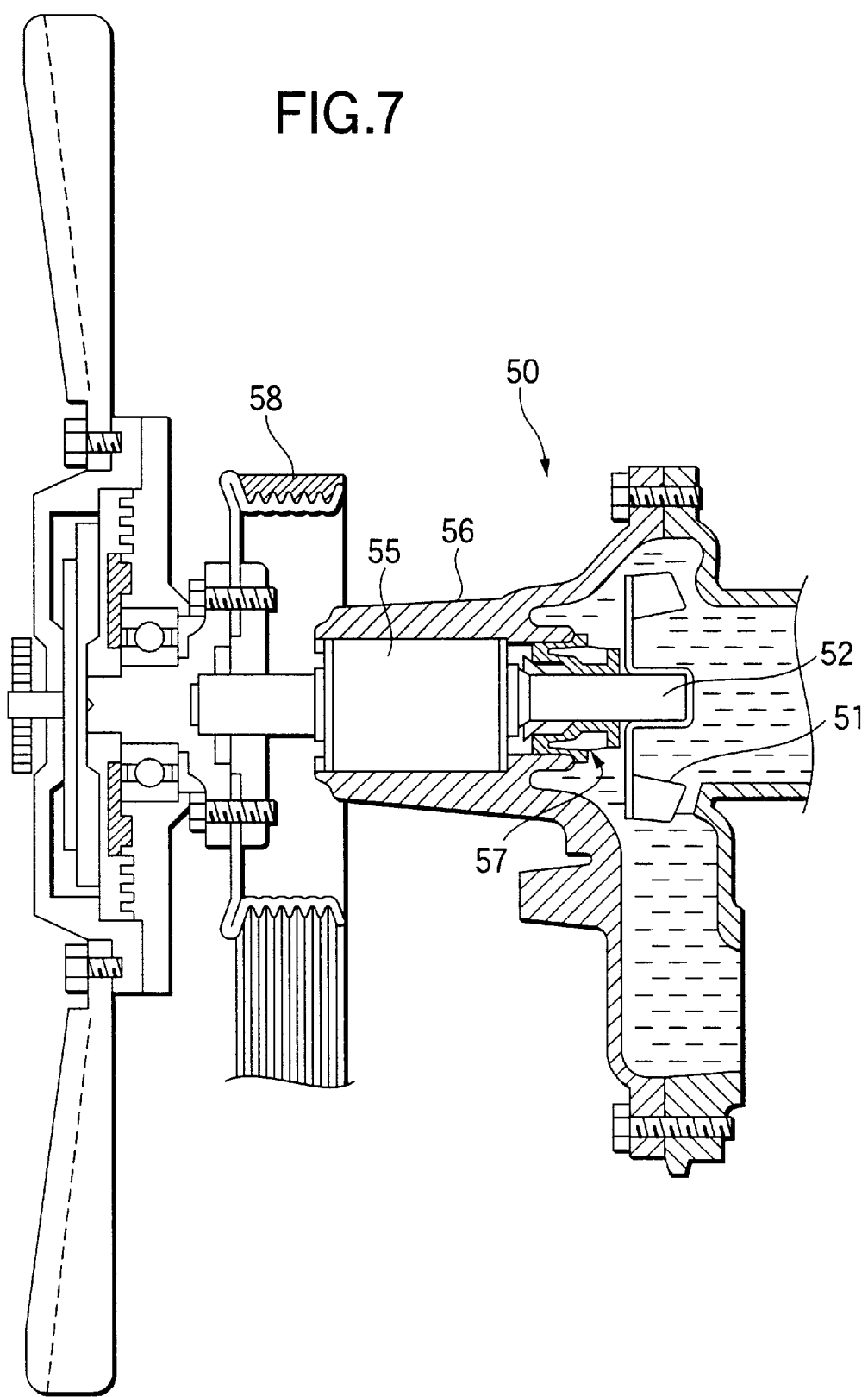
FIG. 7 is a section view from the shaft direction showing an example of a rolling bearing for water pumps to which the invention is applied.

As FIG. 7 shows, a water pump 50 generally has a rotating shaft 52 which is provided with an impeller 51 fixed thereto and connected to a casing 56 by plural rolling bearings 55 located at certain intervals in the shaft direction. Cooling water is tightly sealed by a mechanical seal 57 located between the impeller 51 and the bearings 55. The rotating shaft 51 is directly bonded to a pulley 58 and rotates in association with the rotation of an engine.

Since the sliding faces of the mechanical seal 57 and the rotating shaft 52 are lubricated with water in this state, the water vapor and the like would leak and invade into the rolling bearing 55 side thereby bringing about deterioration of the grease enclosed in the rolling bearing 55. To prevent the invasion of the water vapor and the like and prevent the leakage of the packed grease, a rubber sealing device is provided in the impeller 51 side of the rolling bearing 55. Also, a rubber sealing device is provided in the pulley 31 side of the rolling bearing 55 to prevent the invasion of dusts from outside and prevent the leakage of the packed grease.

Figure 8:
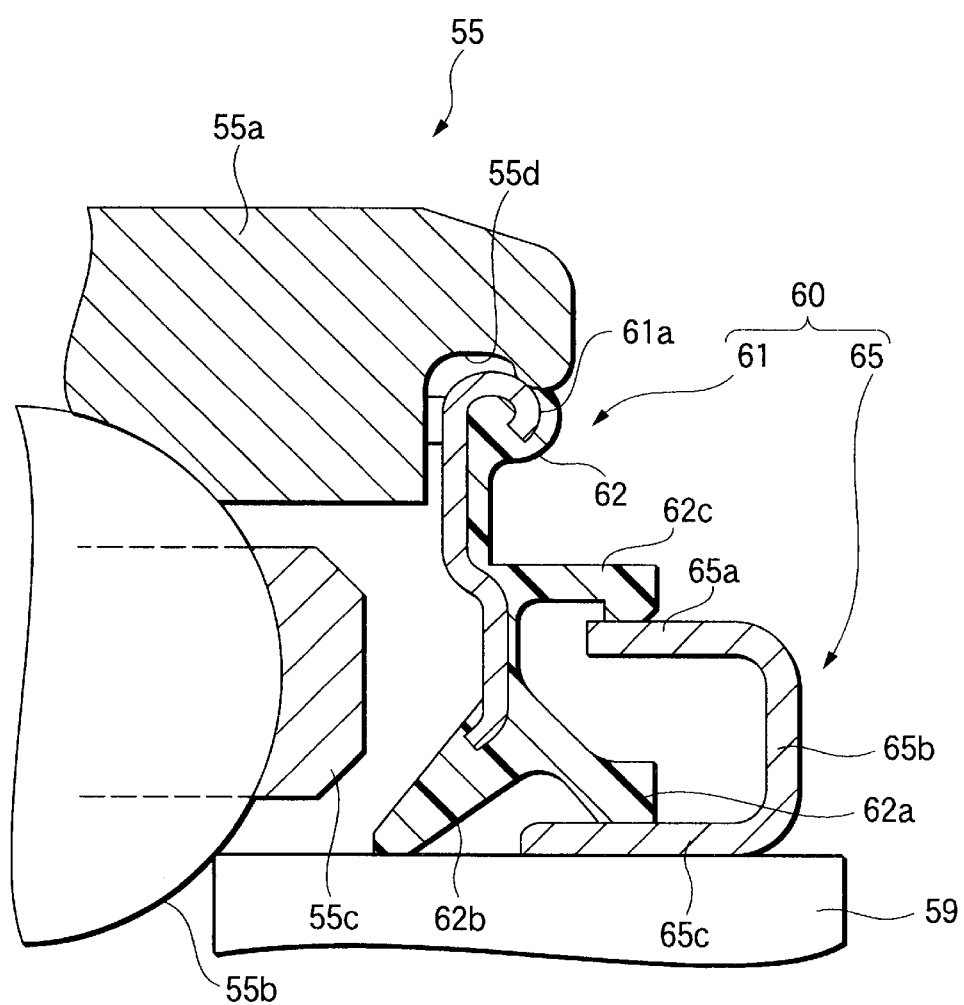
FIG. 8 is a section view from the shaft derection showing the rubber sealing device of the rolling bearing of FIG. 7.

FIG. 8 is a sectional view in the shaft direction which shows the structure of the impeller 51 side of the rolling bearing 55. As FIG. 8 shows, the rolling bearing 55 contains an outer ring 55*a*, a rotating shaft 59 serving as an inner ring, a ball 55*b* held between the outer ring 55*a* and the rotating shaft 59 and a cage 55*c* holding the ball 55*b*. A rubber sealing device 60 contains a sealing plate 61 and a flinger 65 and one end of the sealing plate 61 is fixed to the seal groove 55*d* of the outer ring 55*a*. The sealing plate 61 contains a core metal (a reinforcing member) 61*a* having an inverted L-shaped section and a seal body 62 made of the rubber composition according to the invention. As FIG. 8 shows, the seal body 62 is branched into two in the rotating shaft 59 side. A main lip 62*a* which is one of these branches lengthens downward at angle to the right, while the side lip 62*b* which is the other branch lengthens downward at angle to the left. Further, a third lip 62*c* of a cylindrical shape lengthens to the right in the figure from the seal body 62 at the center of the core metal 61*a*.

On the rotating shaft 59, a stainless flinger 65 is located. This flinger 65 contains a small cylinder 65*c* closely matching with the rotating shaft 59, a large cylinder 65*a* coaxially enclosing it and a flange 65*b* connecting these cylinders in the radius direction. The third lip 62*c* of the seal body 62 comes into contact with the outer periphery of the large cylinder 65*a* of the flinger 65, the main lip 62*a* comes into contact with the outer periphery of the small cylinder 65*c*, and the side lip 62*b* comes into contact with the outer periphery of the rotating shaft 59, thereby each establishing a sealed structure.

In this sealing device 60, water vapor or water droplets coming from outside are received by the outer peripheral face of the flinger 65 and thus the cooling water does not directly fall on the sealing plate 61. Thus, the deformation or expansion of the sealing plate 61 (in particular, at the third lip member 62*c*) can be lessened. On the other hand, the grease or the like packed in the roll bearings 55 is tightly sealed with the side lip 62*b* and the main lip 62*a* of the sealing plate 61 and thus prevented from leakage outward.

Fourth Embodiment: Oil Seal for Shaft

Figure 9:
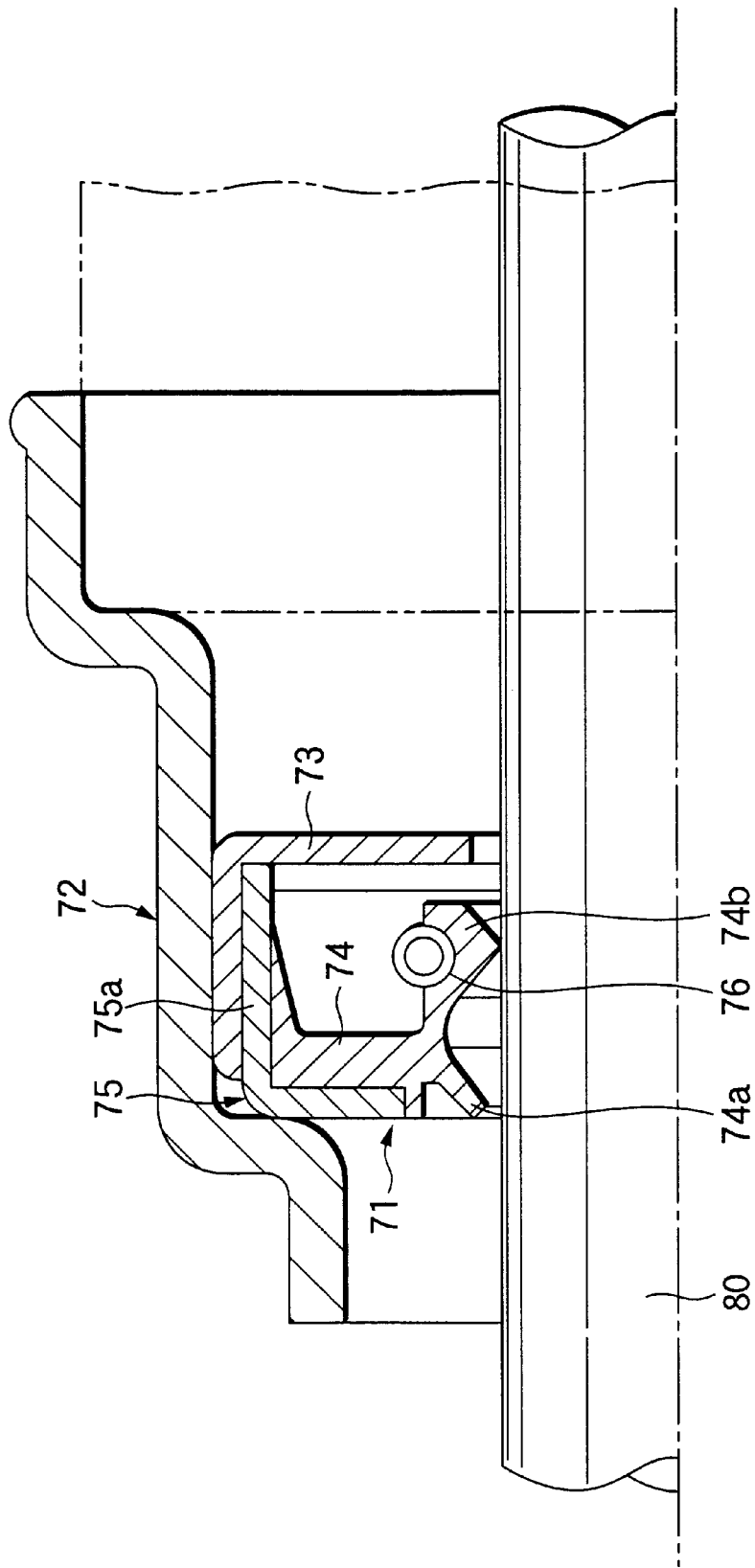
FIG. 9 is a section view showing the main part of an example of an oil seal for a shaft to which the invention is applied.

As the sectional view of FIG. 9 shows, an oil seal 71 for a shaft is a member which is provided between a rotating shaft 80 and a seal case 72. It contains a metal ring (a reinforcing member) 75 having an inverted L-shaped section, the rubber composition according to the invention and a seal body 74 vulcanization-adhered to the metal ring 75. The seal body 74 is branched into two in the rotating shaft 80 side. One of these branches lengthens outward in the shaft direction to form a dust lip 74*a*, while the other branch forms a main lip 74*b* coming in contact with the rotating shaft 80. The main lip 74*b* of the seal body 74 is pressed upon the rotating shaft 80 under definite pressure by a garter spring 76.

This oil seal 71 for bearings is fitted to the rotating shaft 80 by pressing a spring cover 73 in the form of a ring having an inverted L-shaped section into the gap between the matching part 75*a* serving as the outer peripheral face of the metal ring 75 and the seal case 72. The part indicated by the long dashed double-short dashed lines in the figure is the bearing.

In each of the rubber sealing devices of these embodiments, a liquid polybutadiene forms a surface layer having good mold release characteristics. Thus, these devices can be molded at a high accuracy and achieves a highly sealed structure regardless of the complicated shape. Moreover, they are excellent in the mechanical strength and tolerance to liquid chemicals and, therefore, can sustain the sealed structure over a long period of time.

Now, the invention will be illustrated in greater detail by reference to the following Example and Comparative Examples. However, it is to be understood that the invention is not construed as being restricted thereto.

EXAMPLE 1 AND COMPARATIVE EXAMPLES 1 TO 5

First, the feedstock rubbers, the liquid polybutadiene, the filler, the plasticizer and the antioxidant were fed into a Banbury mixer at each composition ratio as shown in Table 1 and then masticated at a mixer temperature of 80° C. Next, the masticated matter was transferred from the Banbury mixer into a twin-roll mill for kneading rubbers. While controlling the roll temperature to 50° C., the crosslinking agent and the auxiliary crosslinking accelerator were added thereto and the mixture was kneaded until it became homogeneous, thereby preparing each rubber composition. Next, a sheet-type vulcanization mold of 2 mm in thickness was put into a hot press heated to 170° C. and then the rubber composition was poured in it. After heating for 20 minutes, a vulcanized rubber sheet of 150 mm in length, 150 mm in width and 2 mm in thickness was obtained.

TABLE 1

Composition list (part by weight)

| Component | Ex.1 | C.Ex.1 | C.Ex.2 | C.Ex.3 | C.Ex.4 | C.Ex.5 |
|---|---|---|---|---|---|---|
| Feedstock rubber: vinylidene fluoride-tetrafluoroethylene-propylene terpolymer (containing vulcanization accelerator, vinylidene fluoride 2 to 5% by mol) (AFLAS SP, Asahi Glass Company Ltd.) | | | 100 | | | |
| Feedstock rubber: vinylidene fluoride-tetrafluoroethylene-propylene terpolymer (containing vulcanization accelerator, vinylidene fluoride 30% by mol) (AFLAS MZ201, Asahi Glass Company Ltd.) | | | | 100 | | |
| Feedstock rubber: tetrafluoroethylene-propylene bipolymer (AFLAS 150 P, Asahi Glass Company Ltd.) | 100 | 100 | | | | |
| Feedstock rubber: vinylidene fluoride-hexafluoropropylene bipolymer (DAIEL G-801, Daikin Industries, Ltd.) | | | | | 100 | |
| Feedstock rubber: nitrile rubber (medium-high acrylonitrile content (JSR NER N230 S, JSR Corporation) | | | | | | 100 |
| Internal mold-releasing agent: hydroxy-ended liquid polybutadiene, number-average m.w.: 2800, formula (1) (Poly bd R-45 HT, Idemitsu Atofina Co., Ltd.) | 3 | | | | | |
| Filler: MT carbon black (Thermax N-990, R.T. Vanderlite Co. Inc.) | 30 | 30 | 30 | 30 | 20 | 50 |
| Crosslinking agent: 1,3-bis(t-butylperoxy)-diisopropylbenzene (PARBUTYL P, NOF Corporation) | 1 | 1 | 1 | | 1.5 | 3 |

TABLE 1-continued

Composition list (part by weight)

| Component | Ex.1 | C.Ex.1 | C.Ex.2 | C.Ex.3 | C.Ex.4 | C.Ex.5 |
|---|---|---|---|---|---|---|
| Auxiliary vulcanization accelerator: MgO (KYOWAMAG 30, Kyowa Chemical Industry Co., Ltd.) | | | 3 | 3 | | |
| Auxiliary vulcanization accelerator: $Ca(OH)_2$ (Rhenofit CF, Rhein Chemie) | | | 6 | 3 | | |
| Auxiliary vulcanization accelerator: triallyl isocyanurate (TAIC, Nippon Kasei Co., Ltd.) | 5 | 5 | 3 | | 4 | |
| Auxiliary vulcanization accelerator: sodium stearate (sodium stearate, Wako Pure Chemical Industries, Ltd.) | 1 | 1 | | | | |
| Auxiliary vulcanization accelerator: zinc oxide (FRANCE 1, Sakai Chemical Industry Co., Ltd.) | | | | | | 5 |
| Auxiliary vulcanization accelerator: stearic acid (Lunac S-35, Kao Corporation) | | | | | | 1 |
| Auxiliary vulcanization accelerator: organic amine (ACTING SL, Yoshitomi Pharmaceutical Co., Ltd.) | | | | | | 2 |
| Plasticizer: dioctyl phthalate (DOP, Daihachi Chemical Industry Co., Ltd.) | | | | | | 5 |
| Antioxidant: 4,4'-bis-(α, α-dixaethylbenzyl) diphenylamine (NOCRACK CD, Ouchi Shinko Chemical Industries, Co., Ltd.) | | | | | | 1 |
| Antioxidant: 2-mercaptobenzimidazole (NOCRACK MB, Ouchi Shinko Chemical Industries, Co., Ltd.) | | | | | | 1 |

By using each of these rubber sheets, a hardness test, a tensile test, measurement of volume-changing ratio and an adhesion test were carried out as follows.

<Hardness Test>

The rubber sheet was punched to give JIS No. 3 test pieces. Three pieces were piled up and the hardness was measured in accordance with JIS K6301.

<Tensile Test>

The JIS No. 3 test pieces made of the rubber sheet were subjected to a tensile test by using a universal test machine according to JIS K6251 and the tensile strength at break and the tensile elongation at break were measured.

<Measurement of volume-changing ratio>

A soluble-type synthetic cutting coolant (YUSHIROKEN SYNTHETIC #660 manufactured by Yushiro Chemical Industry Co., Ltd.) was diluted 20-fold with water to give a concentration employed in practice. The JIS No. 3 test pieces made of the rubber sheet was immersed in this dilution at 70° C. for 1 week and then the volume was measured. Thus the volume-changing ratio was determined by comparing with the volume before the immersion.

<Adhesion Test>

An SPCC core metal (having three screw holes for fixing), onto which an adhesive had been preliminarily stoved, was put into a mold. Then the rubber sheet was put thereinto and vulcanization-adhered to the core metal by heating to thereby prepare samples for the adhesion test as will be shown hereinafter. The adhesives and vulcanization adhesion conditions employed are as follows.

(Adhesives)

Example 1 and Comparative Examples 1 to 4: Chemlok Y4310 (silane-based adhesive having vinyl groups) manufactured by Lord Far East Inc.

Comparative Example 5: METALOC N-15 (phenol-based adhesive) manufactured by Toyo Chemical Laboratories, Inc.

(Secondary Vulcanization Conditions)

Example 1: 4 hours at 200° C.

Comparative Example 1: 4 hours at 200° C.

Comparative Example 2: 24 hours at 200° C.

Comparative Example 3: 24 hours at 230° C.

Comparative Example 4: 4 hours at 180° C.

These test samples were immersed in the soluble-type synthetic cutting coolant dilution employed in the measurement of the volume-changing ratio at 70° C. for 1 week. Then these samples were subjected to a 90° peeling test (JIS K6310) and the data was compared with the results of the same test conducted before the immersion to thereby examine the change in the adhesion properties.

As shown in Table 2 summarizing the results of the tests and measurement as described above, the volume-changing ratio was lessened with a decrease in the molar ratio of vinylidene fluoride. In particular, the samples of Example 1 and Comparative Example 1 which were almost free from vinylidene fluoride were scarcely swelled even in the soluble-type synthetic cutting coolant liquid. However, the sample of Comparative Example 1 was not adhered to the core metal at the point of preparing the test sample, since it contained no liquid polybutadiene. In Comparative Example 5 where commonly employed nitrile rubber was used, the sample was largely swelled and the adhesive was deteriorated and thus lost the adhesion property due to the immersion.

TABLE 2

Comparison of various physical properties

| | Ex. 1 | C.Ex.1 | C.Ex.2 | C.Ex.3 | C.Ex.4 | C.Ex.5 |
|---|---|---|---|---|---|---|
| Hardness, $HD_\lambda$ | 71 | 70 | 76 | 74 | 69 | 76 |
| Tensile strength at break, MPa | 21.2 | 20.9 | 18.2 | 13.7 | 20.9 | 13.0 |

TABLE 2-continued

Comparison of various physical properties

| | Ex. 1 | C.Ex.1 | C.Ex.2 | C.Ex.3 | C.Ex.4 | C.Ex.5 |
|---|---|---|---|---|---|---|
| Tensile elongation at break, % | 250 | 260 | 220 | 210 | 460 | 400 |
| Volume-changing ratio, % | +0.3 | +0.3 | +1.2 | +3.0 | +5.3 | +15.3 |
| Initial rubber residue area, % | 100 | 0 | 100 | 100 | 100 | 100 |
| Rubber residue area after immersion, % | 100 | Not conducted | 100 | 100 | 100 | 0 |

As discussed above, it is possible according to the invention to provide long-life rubber sealing devices which are highly tolerant to, for example, soluble-type synthetic cutting coolants and engine oils suitable for high-speed processing and can sustain favorable sealing performance over a long period of time and rubber compositions appropriate therefor.

While the invention has been described in detail and with reference to specific embodiments thereof, it will be apparent to one skilled in the art that various changes and modifications can be made therein without departing from the spirit and scope thereof.

What is claimed is:

1. A rubber composition to be joined to a reinforcing member of a rubber sealing device which comprises a tetrafluoroethylene-propylene bipolymer and from 0.02 to 10 parts by weight of a liquid polybutadiene per 100 parts by weight of the tetrafluoroethylene-propylene bipolymer.

2. The rubber composition as claimed in claim 1, which comprises from 0.3 to 3 parts by weight of the liquid polybutadiene per 100 parts by weight of the tetrafluoroethylene-propylene bipolymer.

3. The rubber composition as claimed in claim 1, wherein said liquid polybutadiene has the number-average molecular weight of 1,000 to 5,000.

4. The rubber composition as claimed in claim 1, wherein said liquid polybutadiene is a compound having hydroxyl groups in the structure as represented by the following formula (1):

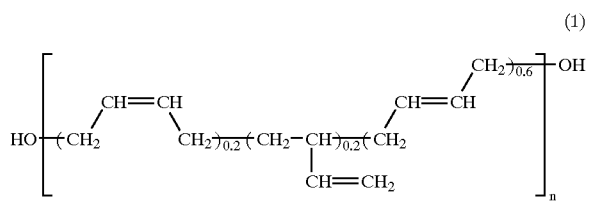

(1)

wherein n represents an integer.

5. The rubber composition as claimed in claim 1, wherein said liquid polybutadiene is a compound having hydroxyl groups in the structure as represented by the following formula (2):

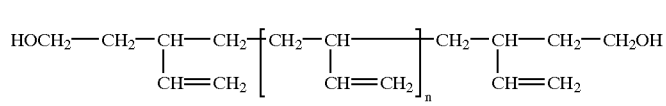

(2)

wherein n represents an integer.

6. The rubber composition as claimed in claim 1, wherein said liquid polybutadiene is a compound having carboxyl groups in the structure as represented by the following formula (3):

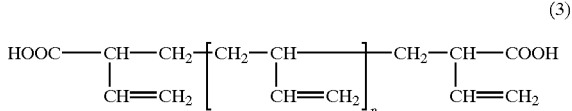

(3)

wherein n represents an integer.

7. The rubber composition as claimed in claim 1, wherein said liquid polybutadiene is a compound free from any functional group in the structure as represented by the following formula (4):

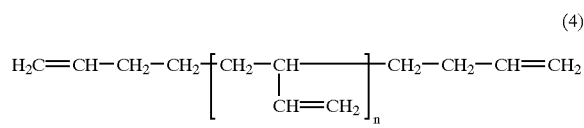

(4)

wherein n represents an integer.

8. A rubber sealing device comprising a reinforcing member and a rubber composition joined thereto, wherein said rubber composition comprises a tetrafluoroethylene-propylene bipolymer and from 0.02 to 10 parts by weight of a liquid polybutadiene per 100 parts by weight of the tetrafluoroethylene-propylene bipolymer.

9. The rubber sealing device as claimed in claim 8, wherein said rubber composition comprises from 0.3 to 3 parts by weight of the liquid polybutadiene per 100 parts by weight of the tetrafluoroethylene-propylene bipolymer.

10. The rubber sealing device as claimed in claim 8, wherein said liquid polybutadiene has the number-average molecular weight of 1,000 to 5,000.

11. The rubber sealing device as claimed in claim 8, wherein said liquid polybutadiene is a compound having hydroxyl groups in the structure as represented by the following formula (1):

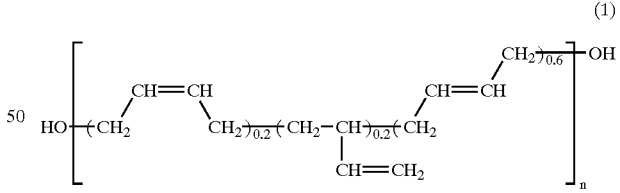

(1)

wherein n represents an integer.

12. The rubber sealing device as claimed in claim 8, wherein said liquid polybutadiene is a compound having hydroxyl groups in the structure as represented by the following formula (2):

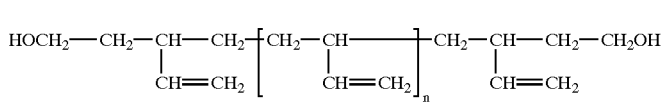

wherein n represents an integer.

13. The rubber sealing device as claimed in claim 8, wherein said liquid polybutadiene is a compound having carboxyl groups in the structure as represented by the following formula (3):

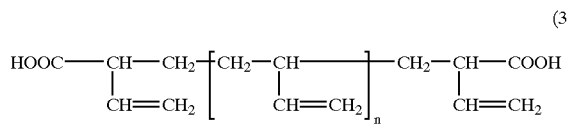

wherein n represents an integer.

14. The rubber sealing device as claimed in claim 8, wherein said liquid polybutadiene is a compound free from any functional group in the structure as represented by the following formula (4):

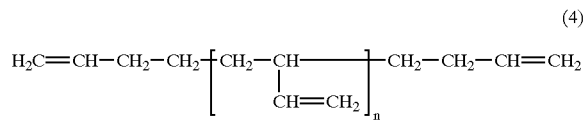

wherein n represents an integer.

15. An oil seal comprising the rubber sealing device claimed in claim 8.

16. A rolling bearing comprising the rubber sealing device claimed in claim 8.

17. A linear guide comprising the rubber sealing device claimed in claim 8.

18. A ball screw comprising the rubber sealing device claimed in claim 8.

* * * * *